(12) United States Patent
Hsu et al.

(10) Patent No.: US 8,470,467 B2
(45) Date of Patent: Jun. 25, 2013

(54) BATTERY CONNECTION TOPOLOGY

(75) Inventors: Chih-Cheng Hsu, Rochester Hills, MI (US); Rebecca S. Ratz, Holly, MI (US)

(73) Assignee: GM Global Technology Operations LLC, Detroit, MI (US)

(*) Notice: Subject to any disclaimer, the term of this patent is extended or adjusted under 35 U.S.C. 154(b) by 343 days.

(21) Appl. No.: 12/788,380

(22) Filed: May 27, 2010

(65) Prior Publication Data

US 2011/0293992 A1    Dec. 1, 2011

(51) Int. Cl.
*H01M 10/38* (2006.01)

(52) U.S. Cl.
USPC .......... 429/123; 429/149; 429/157; 429/161; 429/170

(58) Field of Classification Search
USPC .......... 429/123, 149, 161, 170, 157
See application file for complete search history.

(56) References Cited

U.S. PATENT DOCUMENTS

| | | | |
|---|---|---|---|
| 2007/0059593 A1* | 3/2007 | Kim et al. | 429/162 |
| 2009/0111015 A1* | 4/2009 | Wood et al. | 429/164 |
| 2009/0274952 A1* | 11/2009 | Wood et al. | 429/99 |

* cited by examiner

*Primary Examiner* — Jane Rhee
(74) *Attorney, Agent, or Firm* — Fraser Clemens Martin & Miller LLC; J. Douglas Miller

(57) ABSTRACT

A battery module comprising a plurality of battery cells arranged in a stacked configuration, each of the battery cells including a first terminal disposed on a first end of the battery cell and a second terminal disposed on a second end of the battery cell, wherein the first terminal of at least one of the battery cells is in direct electrical communication with the second terminal of another non-adjacent one of the battery cells.

18 Claims, 3 Drawing Sheets

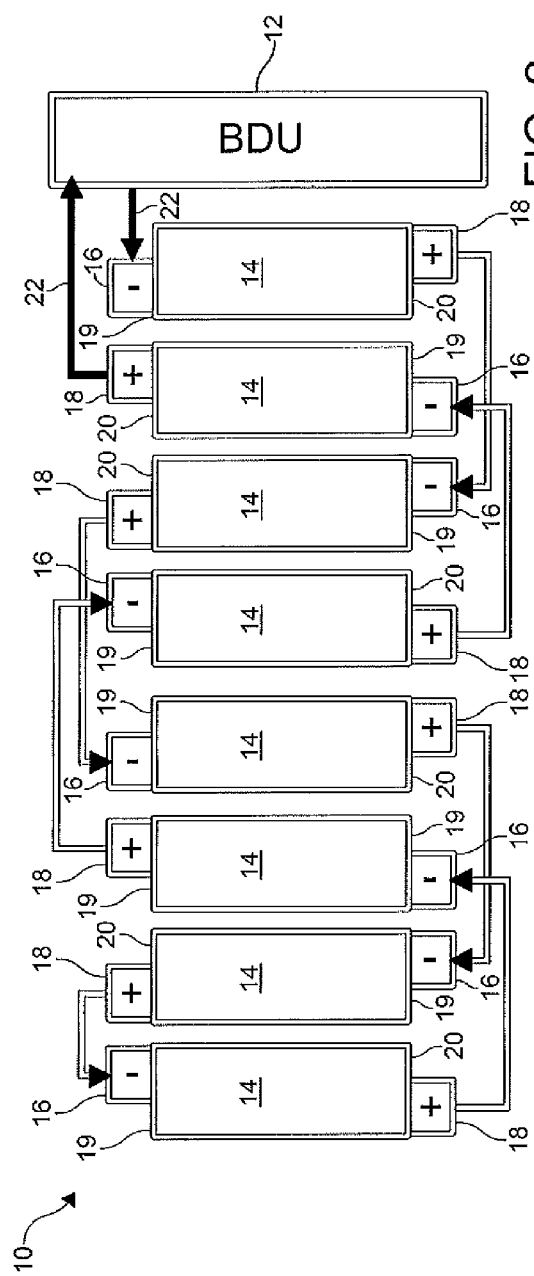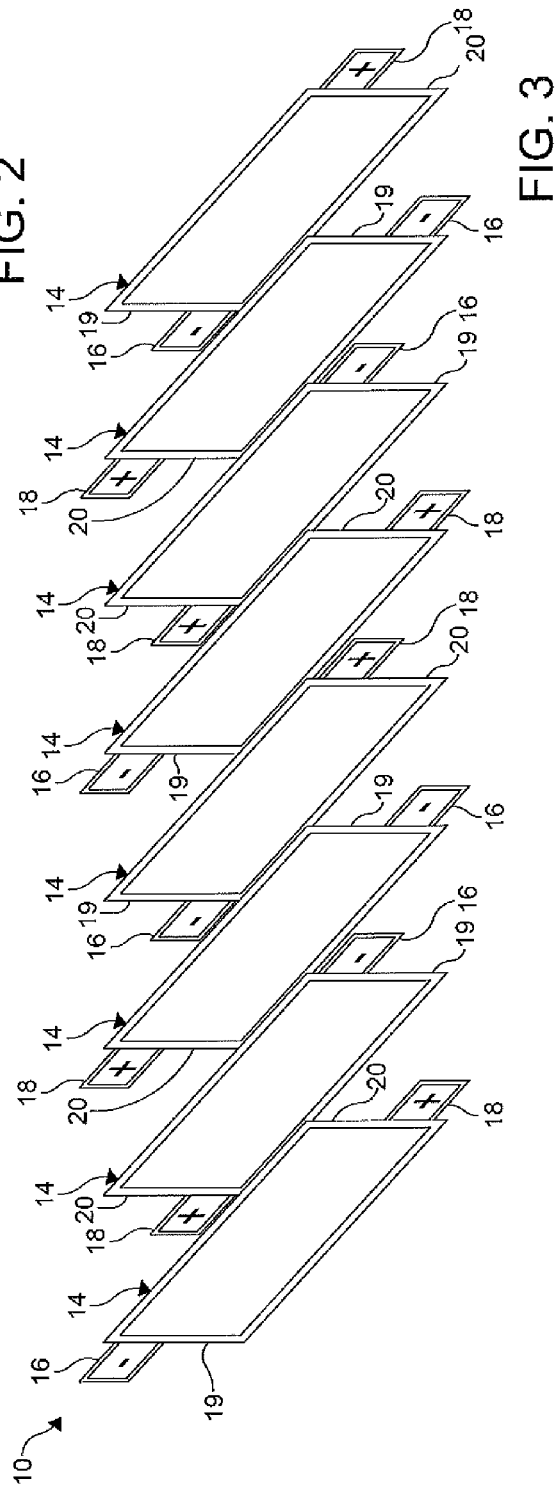

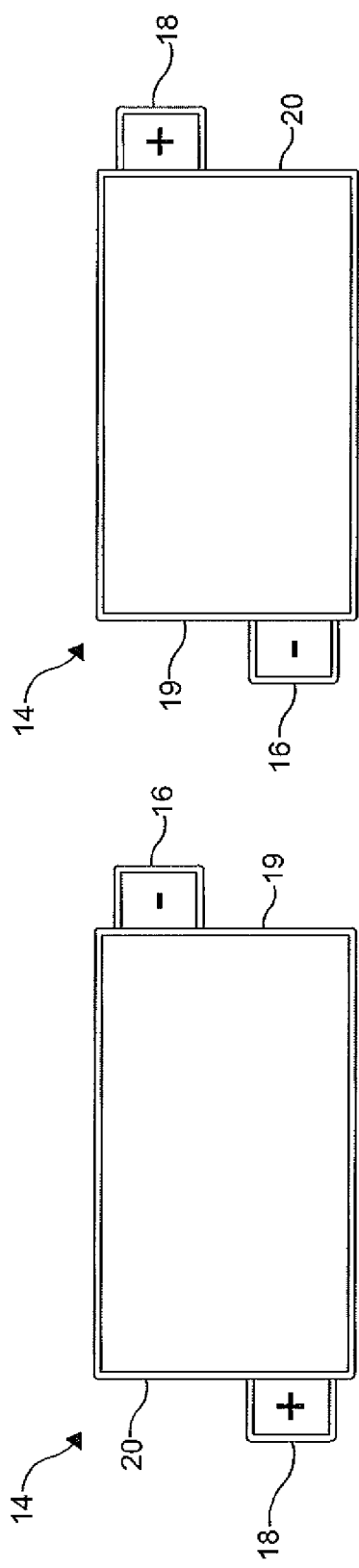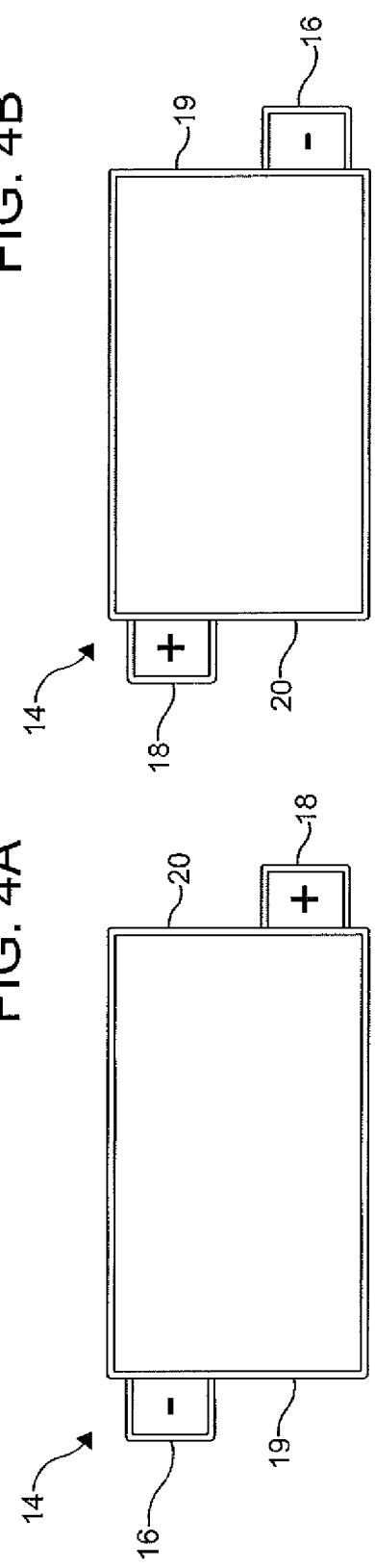

BATTERY CONNECTION TOPOLOGY

FIELD OF THE INVENTION

The present invention relates generally to a battery cell. In particular, the invention is directed to a battery module including a plurality of the battery cells.

BACKGROUND OF THE INVENTION

A battery cell has been proposed as a clean, efficient and environmentally responsible power source for electric vehicles and various other applications. One type of battery cell is known as the lithium-ion battery. The lithium-ion battery is rechargeable and can be formed into a wide variety of shapes and sizes so as to efficiently fill available space in electric vehicles. A plurality of individual lithium-ion battery cells can be provided in a battery cell module to provide an amount of power sufficient to operate electric vehicles.

FIG. 1 illustrates an example of a conventional battery module 1 including a plurality of battery cells 2 arranged in a stacked configuration and in electrical communication with an electrical device (e.g. battery disconnect unit (BDU) 4). Each of the battery cells 2 includes a cathode terminal 6 and an anode terminal 7. As shown, the terminals 6, 7 are centered on opposite ends of each of the battery cells 2. To connect the battery cells in a series electrical configuration, the battery cells are stacked with adjacent ones of the battery cells 2 in a flipped orientation relative to each other, wherein the cathode terminal 6 of one of the battery cells 2 is aligned with the anode terminal 7 of an adjacent one of the battery cells 2 and welded together to establish an electrical connection. One of the battery cells 2 disposed at each end of the stack is in electrical communication with the BDU 4 via a bus bar 8. Since one end of the stack is spaced further from the BDU 4 than the other end, at least one of the bus bars 8 must be relatively long. The bus bars 8 consistently generate heat during charging/discharging and are typically spaced from a cooling source.

It would be desirable to develop a battery module including a plurality of battery cells arranged in a stacked configuration, wherein a topology of the stacked battery cells minimizes a length of a bus bar used to connect the battery cells to an electrical device.

SUMMARY OF THE INVENTION

Concordant and consistent with the present invention, a battery module including a plurality of battery cells arranged in a stacked configuration, wherein a topology of the stacked battery cells minimizes a length of a bus bar used to connect the battery cells to a secondary electrical device, has surprisingly been discovered.

In one embodiment, a battery module comprises a plurality of battery cells arranged in a stacked configuration, each of the battery cells including a first terminal disposed on a first end of the battery cell and a second terminal disposed on a second end of the battery cell, wherein the first terminal of at least one of the battery cells is in direct electrical communication with the second terminal of another non-adjacent one of the battery cells.

In another embodiment, a battery module comprises a plurality of battery cells arranged in a stacked configuration, each of the battery cells including a positive terminal disposed on a first end of the battery cell and a negative terminal disposed on a second end of the battery cell, wherein the positive terminal and the negative terminal of at least one of the battery cells are obliquely disposed on opposite ends of the at least one of the battery cells.

In yet another embodiment, a battery assembly comprises: a plurality of battery cells arranged in a stacked configuration, each of the battery cells including a positive terminal disposed on a first end of the battery cell and a negative terminal disposed on a second end of the battery cell; and a battery disconnect unit in electrical communication with a pair of adjacent ones of the battery cells.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which:

FIG. 2 is schematic representation of a battery module in electrical communication with a battery disconnect unit according to an embodiment of the present invention;

FIG. 3 is a schematic exploded perspective view of a plurality of battery cells of the battery module of FIG. 2;

FIG. 4A is a schematic front elevational view of a battery cell of the battery module of FIG. 2, showing a first orientation;

FIG. 4B is a schematic front elevational view of the battery cell of FIG. 4A, showing a second orientation;

FIG. 4C is a schematic rear elevational view of a battery cell of FIG. 4A, showing a third orientation; and FIG. 4D is a schematic rear elevational view of the battery cell of FIG. 4B, showing a fourth orientation.

DETAILED DESCRIPTION OF EXEMPLARY EMBODIMENTS OF THE INVENTION

Figure 1:
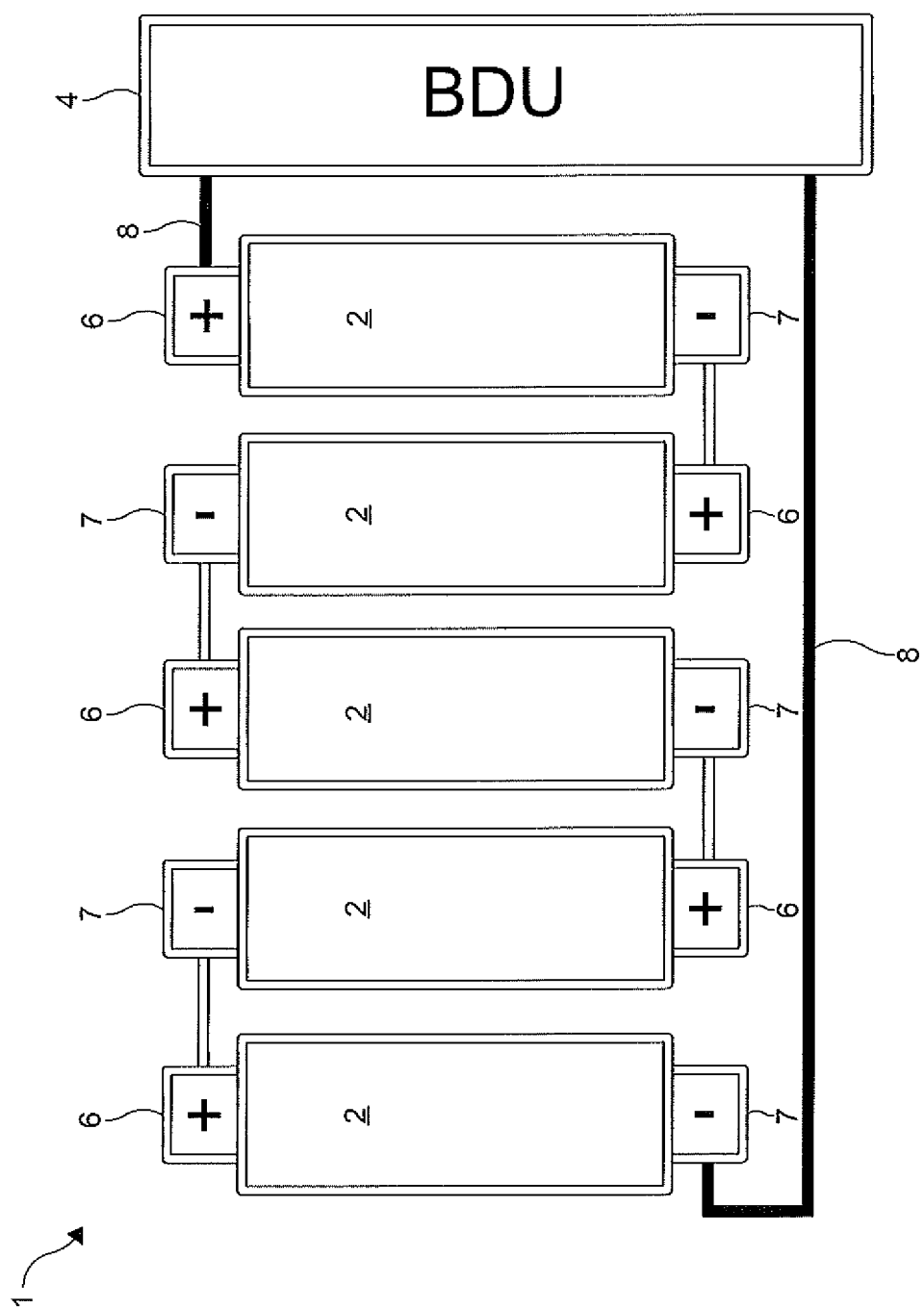
FIG. 1 is a schematic representation of a connection topology for a battery module according to the prior art.

The following detailed description and appended drawings describe and illustrate various embodiments of the invention. The description and drawings serve to enable one skilled in the art to make and use the invention, and are not intended to limit the scope of the invention in any manner.

FIGS. 2-4 illustrate a battery module 10 in electrical communication with a battery disconnect unit 12 (BDU) according to an embodiment of the present invention. It is understood that the battery module 10 may be in electrical communication with other systems and devices. It is further understood that the battery module 10 may be integrated in an electric vehicle.

As more clearly shown in FIG. 3, the battery module 10 includes a plurality of battery cells 14 arranged in a stacked configuration. Each of the battery cells 14 includes a pair of terminals 16, 18 (e.g. tabs). As a non-limiting example, the first terminal 16 (e.g. anode) is associated with a negative electrical charge and the second terminal 18 (e.g. cathode) is associated with a positive electrical charge. As a further non-limiting example, the battery cells 14 are connected to each other in a series electrical configuration. However, other configurations can be used.

In certain embodiments, the first terminal 16 and the second terminal 18 of at least one of the battery cells 14 are disposed on opposite ends 19, 20 of the at least one of the battery cells 14. As a non-limiting example, the first terminal 16 and the second terminal 18 of at least one of the battery cells 14 are obliquely disposed on the opposite ends 19, 20 thereof, wherein the at least one of the battery cells 14 can be arranged in four distinct orientations, as illustrated in FIGS.

4A-4D. As a non-limiting example, each of the terminals 16, 18 is disposed adjacent an opposite corner of each of the battery cells 14. It is understood that that the terminals 16, 18 can be spaced from a corner of an associated one of the battery cells 14 or flush with an edge of the associated one of the battery cells 14.

The battery disconnect unit (BDU) 12 is typically a switchable device to selectively provide electrical communication between the battery module 10 and an electrical system (not shown). In certain embodiments the BDU 12 protects the battery module 10 against unexpected discharge and can disconnect the battery module 10 from a connected electrical system in the event of a short circuit or fault condition.

In certain embodiments the BDU 12 is in electrical communication with a pair of adjacent ones of the battery cells 14. As a non-limiting example, at least one of the pair of adjacent ones of the battery cells 14 is disposed on an end of the stack of the battery cells 14. As a further non-limiting example, the battery module 10 is in electrical communication with the BDU 12 via a plurality of bus bars 22. The bus bars 22 are typically formed from a high electrical conductivity material such as copper, aluminum or gold. As a non-limiting example, an exterior surface of at least one of the bus bars 22 is covered with insulating materials (not shown) such as those for electrical cables or plugs to avoid unwanted electrical contact.

In use, each of the battery cells 14 is disposed adjacent another of the battery cells 14 having a different orientation to form a stacked configuration. The terminals 16, 18 of each of the battery cells 14 are electrically coupled to each other in a pre-determined sequence and electrical configuration (e.g. in series). As a non-limiting example, the first terminal 16 (e.g. anode) of at least one of the battery cells 14 is in direct electrical communication with the second terminal 18 (e.g. cathode) of another non-adjacent one of the battery cells 14. As a further non-limiting example, a direct electrical communication can be defined as a current flowing between the first terminal 16 (e.g. anode) of the at least one of the battery cells 14 and the second terminal 18 (e.g. cathode) of the non-adjacent one of the battery cells 14 without intervening electrical contact with another of the battery cells 14.

In certain embodiments, the first terminal 16 of at least one of the battery cells 14 is directly coupled to the second terminal 18 of another non-adjacent one of the battery cells 14 using a welding technique (e.g. ultrasonic) or a mechanical fastener (e.g. a C-channel connector, a J-bar, and the like).

The BDU 12 is then electrically coupled to the stack of the battery cells 14. As a non-limiting example, the BDU 12 is in electrical communication with a pair of adjacent ones of the battery cells 14. As a further non-limiting example, the BDU 12 is in electrical communication with a pair of adjacent ones of the battery cells 14, wherein at least one of the adjacent pair of the battery cells 14 is disposed on an end of the stack of the battery cells 14. Accordingly, the stack of the battery cells 14 generates an electrical voltage for use by the connected electrical system.

The battery module 10 minimizes a bus bar part count and a length of the required bus bars 22, minimizes heat generation from the bus bars 22 during charging and discharging, and localizes a position of the bus bars 22 to maximize thermal management via a strategic position of a cooling system.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A battery module comprising a plurality of battery cells arranged in a stacked configuration, each of the battery cells including a first terminal disposed on a first end of the battery cell and a second terminal disposed on a second end of the battery cell, wherein the first terminal of at least one of the battery cells is in direct electrical communication with the second terminal of another non-adjacent one of the battery cells.

2. The battery module according to claim 1, wherein the first terminal and the second terminal of at least one of the battery cells are obliquely disposed on the at least one of the battery cells.

3. The battery module according to claim 1, wherein the first terminal of at least one of the battery cells is coupled directly to the second terminal of another non-adjacent one of the battery cells.

4. The battery module according to claim 1, further comprising a battery disconnect unit in electrical communication with at least one of the battery cells.

5. The battery module according to claim 1, further comprising a battery disconnect unit in electrical communication with at least one of the battery cells with a bus bar.

6. The battery module according to claim 1, further comprising a battery disconnect unit in electrical communication with a pair of adjacent ones of the battery cells.

7. The battery module according to claim 6, wherein one of the pair of adjacent ones of the battery cells is disposed on an end of the stacked configuration of the battery cells.

8. The battery module according to claim 1, wherein each of the battery cells is electrically connected in series.

9. A battery module comprising a plurality of battery cells arranged in a stacked configuration, each of the battery cells including a positive terminal disposed on a first end of the battery cell and a negative terminal disposed on a second end of the battery cell, wherein the positive terminal and the negative terminal of at least one of the battery cells are obliquely disposed on the at least one of the battery cells, wherein the positive terminal of at least one of the battery cells is coupled directly to the negative terminal of another non-adjacent one of the battery cells.

10. The battery module according to claim 9, further comprising a battery disconnect unit in electrical communication with at least one of the battery cells.

11. The battery module according to claim 9, further comprising a battery disconnect unit in electrical communication with at least one of the battery cells with a bus bar.

12. The battery module according to claim 9, further comprising a battery disconnect unit in electrical communication with a pair of adjacent ones of the battery cells.

13. The battery module according to claim 12, wherein one of the pair of adjacent ones of the battery cells is disposed on an end of the stacked configuration of the battery cells.

14. The battery module according to claim 9, wherein each of the battery cells is electrically connected in series.

15. A battery assembly comprising:
a plurality of battery cells arranged in a stacked configuration, each of the battery cells including a positive terminal disposed on a first end of the battery cell and a negative terminal disposed on a second end of the battery cell, wherein the positive terminal and the negative terminal of at least one of the battery cells are obliquely disposed on the at least one of the battery cells, wherein the positive terminal of at least one of the battery cells is coupled directly to the negative terminal of another non-adjacent one of the battery cells; and
a battery disconnect unit in electrical communication with a pair of adjacent ones of the battery cells.

16. The battery module according to claim 15, wherein the battery disconnect unit is in electrical communication with the at least one of the battery cells with a bus bar.

17. The battery module according to claim 15, wherein one of the pair of adjacent ones of the battery cells is disposed on an end of the stacked configuration of the battery cells.

18. The battery module according to claim 15, wherein each of the battery cells is electrically connected in series.

* * * * *